(12) United States Patent  (10) Patent No.: US 7,524,540 B2
Saito et al.  (45) Date of Patent: *Apr. 28, 2009

(54) LIQUID CRYSTAL COMPOSITION AND LIQUID CRYSTAL DISPLAY DEVICE

(75) Inventors: Masayuki Saito, Chiba (JP); Motoki Yanai, Chiba (JP); Shuichi Goto, Chiba (JP)

(73) Assignees: Chisso Corporation, Osaka (JP); Chisso Petrochemical Corporation, Tokyo (JP)

( * ) Notice: Subject to any disclaimer, the term of this patent is extended or adjusted under 35 U.S.C. 154(b) by 255 days.

This patent is subject to a terminal disclaimer.

(21) Appl. No.: 11/598,707

(22) Filed: Nov. 14, 2006

(65) Prior Publication Data
US 2007/0108411 A1    May 17, 2007

(30) Foreign Application Priority Data
Nov. 15, 2005   (JP)   ............... 2005-329542

(51) Int. Cl.
C09K 19/34   (2006.01)
C09K 19/54   (2006.01)

(52) U.S. Cl. ................. 428/1.1; 252/299.61; 252/299.5

(58) Field of Classification Search ............ 252/299.61, 252/299.5; 428/1.1
See application file for complete search history.

(56) References Cited

U.S. PATENT DOCUMENTS

| 6,824,707 | B2* | 11/2004 | Amakawa et al. ...... 252/299.01 |
| 6,958,176 | B2* | 10/2005 | Li et al. ................. 428/1.1 |
| 2003/0127627 | A1 | 7/2003 | Amakawa et al. |
| 2007/0108409 | A1* | 5/2007 | Yanai et al. ............ 252/299.61 |

FOREIGN PATENT DOCUMENTS

| EP | 0 123 907 A2 | 7/1984 |
| JP | 55-23169 A | 2/1980 |
| JP | 59-216876 A | 12/1984 |
| JP | 60-67587 A | 4/1985 |
| JP | 9-291282 A | 11/1997 |
| JP | 2002-256267 A | 9/2002 |

* cited by examiner

*Primary Examiner*—Shean C Wu
(74) *Attorney, Agent, or Firm*—Hogan & Hartson LLP

(57) ABSTRACT

A liquid crystal composition having a nematic phase that includes two components, wherein the first component is at least one compound selected from the group of compounds represented by formula (1), and the second component is at least one compound selected from the group of compounds having a group represented by formula (2) as a partial structure:

(1)

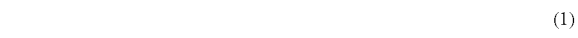

(2)

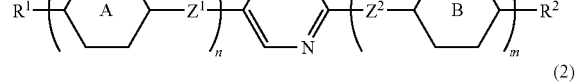

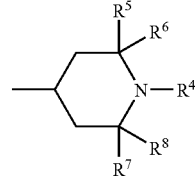

wherein $R^1$ and $R^2$ are each independently hydrogen, fluorine, alkyl having 1 to 12 carbons, alkenyl having 2 to 12 carbons or alkoxy having 1 to 12 carbons; $R^4$ is hydrogen, alkyl having 1 to 12 carbons or alkoxy having 1 to 12 carbons; $R^5$, $R^6$, $R^7$ and $R^8$ are each independently alkyl having 1 to 12 carbons; ring A and ring B are each independently 1,4-cyclohexylene, 1,4-phenylene, 3-fluoro-1,4-phenylene or 3,5-difluoro-1,4-phenylene; $Z^1$ and $Z^2$ are each independently a single bond or ethylene; and n and m are each independently 0, 1 or 2, provided that the sum of n and m is 1, 2, 3 or 4.

16 Claims, No Drawings

LIQUID CRYSTAL COMPOSITION AND LIQUID CRYSTAL DISPLAY DEVICE

CROSS REFERENCE TO RELATED APPLICATIONS

This application claims priority under 35 U.S.C. §119 to Japanese Patent Application No. JP 2005-329542, filed Nov. 15, 2005, which is expressly incorporated herein by reference in its entirety.

BACKGROUND OF THE INVENTION

1. Field of the Invention

The invention relates to a liquid crystal composition suitable for use in an active matrix (AM) device, and an AM device containing the composition.

2. Related Art

In a liquid crystal display device, classification based on an operating mode of liquid crystals includes phase change (PC), twisted nematic (TN), super twisted nematic (STN), electrically controlled birefringence (ECB), optically compensated bend (OCB), in-plane switching (IPS), vertical alignment (VA), and so forth. Classification based on a driving mode includes a passive matrix (PM) and an active matrix (AM). PM is further classified into static, multiplex and so forth, and AM is classified into a thin film transistor (TFT), a metal insulator metal (MIM) and so forth. TFT is further classified into amorphous silicon and polycrystal silicon. The latter is classified into a high temperature type and a low temperature type according to a production process. Classification based on a light source includes a reflection type utilizing a natural light, a transmission type utilizing a backlight and a semi-transmission type utilizing both the natural light and the backlight.

These devices contain a liquid crystal composition having suitable characteristics. The liquid crystal composition has a nematic phase. General characteristics of the composition should be improved to obtain an AM device having good general characteristics. Table 1 below summarizes a relationship between the general characteristics of the two. The general characteristics of the composition will be explained further based on a commercially available AM device. A temperature range of a nematic phase relates to the temperature range in which the device can be used. A desirable maximum temperature of the nematic phase is approximately 70° C. or more and a desirable minimum temperature is approximately −10° C. or less. The viscosity of the composition relates to the response time of the device. A short response time is desirable for displaying a moving image. Accordingly, a small viscosity of the composition is desirable. A small viscosity at a low temperature is more desirable.

TABLE 1

General Characteristics of a Liquid Crystal Composition and an AM Device

| No | General Characteristics of a Composition | General Characteristics of an AM Device |
|---|---|---|
| 1 | Temperature range of a nematic phase is wide | Usable temperature range is wide |
| 2 | Viscosity is small[1] | Response time is short |
| 3 | Optical anisotropy is suitable | Contrast ratio is large |
| 4 | Dielectric anisotropy is positively or negatively large | Driving voltage is low and electric power consumption is small |
| 5 | Specific resistance is large | Voltage holding ratio is large and a contrast ratio is large |
| 6 | It is stable to ultraviolet light and heat | Service life is long |

[1]A liquid crystal composition can be injected into a cell in a short time.

The optical anisotropy of the composition relates to the contrast ratio of the device. A product (Δn·d) of the optical anisotropy (Δn) of the composition and the cell gap (d) of the device is designed to maximize the contrast ratio. A suitable value of the product depends on the kind of operation mode. In a device having a TN mode and so forth, a suitable value is approximately 0.45 μm. In this case, a composition having a large optical anisotropy is desirable for a device having a small cell gap. A large dielectric anisotropy of the composition contributes to a low threshold voltage, a small electric power consumption and a large contrast ratio. Accordingly, a large dielectric anisotropy is desirable. A large specific resistance of the composition contributes to a large voltage holding ratio and a large contrast ratio of the device. Accordingly, a composition having a large specific resistance is desirable at room temperature and also at a high temperature in the initial stage. A composition having a large specific resistance is desirable at room temperature and also at a high temperature after it has been used for a long time. A stability of the composition to an ultraviolet light and heat relates to a service life of the liquid crystal display device. In the case where the stability is high, the device has a long service life. These characteristics are desirable for an AM device used in a liquid crystal projector, a liquid crystal television and so forth.

Conventional compositions are disclosed in the following patent documents. JP S55-023169 A/1980, JP S59-216876 A/1984, JP S60-067587 A/1985, JP H9-291282 A/1997, US 2003/0127627 A and JP 2002-256267.

A desirable AM device is characterized as having a usable temperature range that is wide, a response time that is short, a contrast ratio that is large, a threshold voltage that is low, a voltage holding ratio that is large, a service life that is long, and so forth. Even one millisecond shorter response time is desirable. Thus, the composition having characteristics such as a high maximum temperature of a nematic phase, a low minimum temperature of a nematic phase, a small viscosity, a large optical anisotropy, a large dielectric anisotropy, a large specific resistance, a high stability to an ultraviolet light, a high stability to heat, and so forth is especially desirable.

SUMMARY OF THE INVENTION

The invention concerns a liquid crystal composition having a nematic phase that includes two components, wherein the first component is at least one compound selected from the group of compounds represented by formula (1), and the second component is at least one compound selected from the group of compounds having a group represented by formula (2) as a partial structure:

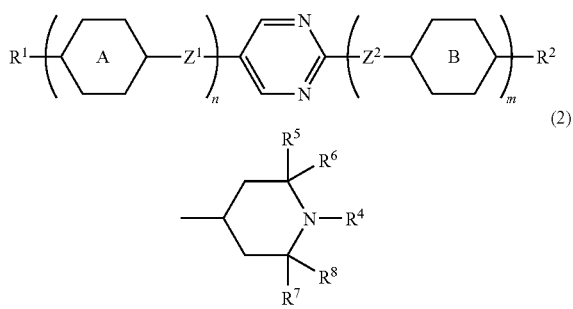

wherein $R^1$ and $R^2$ are each independently hydrogen, fluorine, alkyl having 1 to 12 carbons, alkenyl having 2 to 12 carbons or alkoxy having 1 to 12 carbons; $R^4$ is hydrogen, alkyl having 1 to 12 carbons or alkoxy having 1 to 12 carbons; $R^5$, $R^6$, $R^7$ and $R^8$ are each independently alkyl having 1 to 12 carbons; ring A and ring B are each independently 1,4-cyclohexylene, 1,4-phenylene, 3-fluoro-1,4-phenylene or 3,5-difluoro-1,4-phenylene; $Z^1$ and $Z^2$ are each independently a single bond or ethylene; and n and m are each independently 0, 1 or 2, provided that the sum of n and m is 1, 2, 3 or 4.

The invention also concerns a liquid display device that includes the liquid crystal composition, and so forth.

DETAILED DESCRIPTION OF THE INVENTION

Reference will now be made in detail to the preferred embodiments of the invention. This invention may, however, be embodied in many different forms and should not be construed as limited to the embodiments set forth herein. In addition and as will be appreciated by one of skill in the art, the invention may be embodied as a method, system or process.

The terms used in the specification and claims are defined as follows. The liquid crystal composition and/or the liquid crystal display device of the invention may occasionally be expressed simply as "the composition" or "the device," respectively. A liquid crystal display device is a generic term for a liquid crystal display panel and a liquid crystal display module. The "liquid crystal compound" is a generic term for a compound having a liquid crystal phase such as a nematic phase, a smectic phase and so forth, and also for a compound having no liquid crystal phase but being useful as a component of a composition. The useful compound contains a 6-membered ring such as 1,4-cyclohexylene and 1,4-phenylene, and a rod like molecular structure. An optically active compound may occasionally be added to the composition. Even in the case where the compound is a liquid crystal compound, the compound is classified into an additive. At least one compound selected from a group of compounds represented by formula (1) may be abbreviated to "the compound (1)." The group of compounds represented by formula (1) may also be abbreviated to "the compound (1)." The other formulas are applied with the same rules.

A higher limit of a temperature range of a nematic phase may be abbreviated to "a maximum temperature." A lower limit of a temperature range of a nematic phase may be abbreviated to "a minimum temperature." "A specific resistance is large" means that the composition has a large specific resistance at room temperature and also at a high temperature in the initial stage, the composition has a large specific resistance at room temperature and also at a high temperature even after it has been used for a long time. "A voltage holding ratio is large" means that a device has a large voltage holding ratio at room temperature and also at a high temperature in the initial stage, the device has a large voltage holding ratio at room temperature and also at a high temperature even after it has been used for a long time. In the description of the characteristics, such as optical anisotropy, the characteristics of the composition such as the optical anisotropy and so forth are values measured in the methods disclosed in Examples. "A ratio of the first component" means the percentage by weight (% by weight) based on the total weight of liquid crystal composition. A ratio of the second component and so forth are applied with the same rule. A ratio of an additive mixed with the composition means the percentage by weight (% by weight) based on the total weight of liquid crystal composition.

In the case where the first component is only one compound, "a ratio of the first component" means the ratio of the compound. In the case where the first component contains plural compounds, "a ratio of the first component" means the total ratio of the compounds. "A ratio of the second component," "a ratio of a compound represented by formula (1-2)" and so forth are applied with the same rule.

"At least one compound selected from the group of compounds represented by formula (1) as the first component" means that the first component is selected only from compounds (1), and the first component does not contain compounds other than compounds (1). The case where the first component is selected from the other compounds is applied with the same rule, and the second component and so forth are also applied with the same rule.

In the case where the first component (1) is only one compound, "a compound represented by formula (1)" means the compound. In the case where the first component contains plural compounds, "a compound represented by formula (1)" means all the plural compounds (1). The other formulas are applied with the same rule.

One of the advantages of the invention is to provide a liquid crystal composition that satisfies many characteristics among the characteristics such as a high maximum temperature of a nematic phase, a low minimum temperature of a nematic phase, a small viscosity, a large optical anisotropy, a large dielectric anisotropy, a large specific resistance, a high stability to ultraviolet light and a high stability to heat. Another of the advantages of the invention is to provide a liquid crystal composition that is properly balanced regarding many characteristics. Another of the advantages of the invention is to provide a liquid crystal display device that contains the liquid crystal composition. One aspect of the invention is to provide a liquid crystal composition that has a large optical anisotropy, a large dielectric anisotropy, a high stability to ultraviolet light and so forth, and is to provide an AM device that has a short response time, a large voltage holding ratio, a large contrast ratio, a long service life and so forth.

The first component of the invention has been widely used mainly for a PM device as a compound having a small viscosity, a large optical anisotropy and a large dielectric anisotropy. However, the composition cannot be used for an AM device due mainly to its deteriorating stability when exposed to ultraviolet light and decrease in voltage holding ratio. In the invention, a liquid crystal composition for an AM device that satisfies the aforementioned characteristics without deterioration in stability upon exposure to ultraviolet light of the first component. In the invention, such an effect has been found that the stability to ultraviolet light of the first component is suppressed from being deteriorated by adding the second component as a light stabilizer to the first component.

The liquid crystal composition of the invention satisfies many characteristics among the characteristics such as a high maximum temperature of a nematic phase, a low minimum temperature of a nematic phase, a small viscosity, a large optical anisotropy, a large dielectric anisotropy, a large specific resistance, a high stability to ultraviolet light and a high stability to heat. The composition is properly balanced regarding many characteristics. The liquid crystal display device of the invention contains the liquid crystal composition. The composition has a large optical anisotropy, a large dielectric anisotropy, a high stability to ultraviolet light and so forth, and is suitable for an AM device that has a short response time, a large voltage holding ratio, a large contrast ratio, a long service life and so forth.

The invention has the following features:

1. A liquid crystal composition having a nematic phase that includes two components, wherein the first component is at least one compound selected from the group of compounds represented by formula (1), and the second component is at least one compound selected from the group of compounds having a group represented by formula (2) as a partial structure:

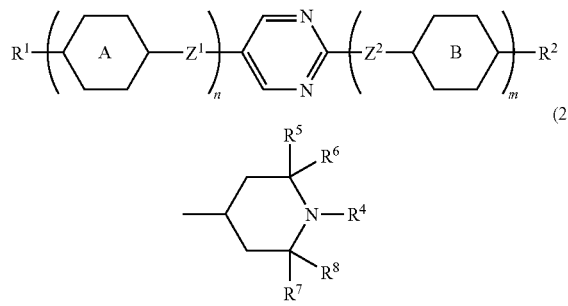

wherein $R^1$ and $R^2$ are each independently hydrogen, fluorine, alkyl having 1 to 12 carbons, alkenyl having 2 to 12 carbons or alkoxy having 1 to 12 carbons; $R^4$ is hydrogen, alkyl having 1 to 12 carbons or alkoxy having 1 to 12 carbons; $R^5$, $R^6$, $R^7$ and $R^8$ are each independently alkyl having 1 to 12 carbons; ring A and ring B are each independently 1,4-cyclohexylene, 1,4-phenylene, 3-fluoro-1,4-phenylene or 3,5-difluoro-1,4-phenylene; $Z^1$ and $Z^2$ are each independently a single bond or ethylene; and n and m are each independently 0, 1 or 2, provided that the sum of n and m is 1, 2, 3 or 4.

2. The liquid crystal composition according to item 1, wherein the first component is at least one compound selected from the group of compounds represented by formula (1) wherein one of $R^1$ and $R^2$ is fluorine, and the second component is at least one compound selected from the group of compounds represented by formulas (2-1) and (2-2):

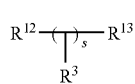

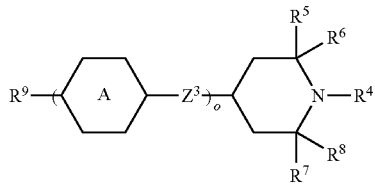

wherein $R^3$ is fluorine or group represented by formula (J), provided that at least one of $R^3$ is group represented by formula (J);

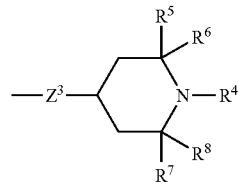

$R^4$ is hydrogen, alkyl having 1 to 12 carbons or alkoxy having from 1 to 12 carbons; $R^5$, $R^6$, $R^7$ and $R^8$ are each independently alkyl having 1 to 12 carbons; $R^9$ is alkyl having 1 to 12 carbons or alkenyl having 2 to 12 carbons; $R^{12}$ and $R^{13}$ are each independently hydrogen or alkyl having 1 to 5 carbons; ring A is 1,4-cyclohexylene, 1,4-phenylene, 3-fluoro-1,4-phenylene or 3,5-difluoro-1,4-phenylene; $Z^3$ is a single bond, ethylene or ester; s is an integer of 1 to 20; and o is 1 or 2.

3. The liquid crystal composition according to item 1 or 2, wherein the first component is at least one compound selected from the group of compounds represented by formulas (1-1) to (1-4):

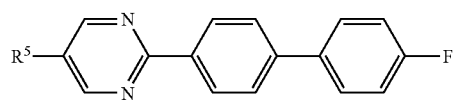

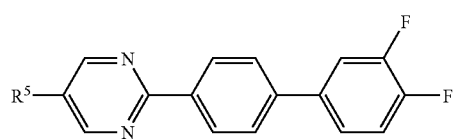

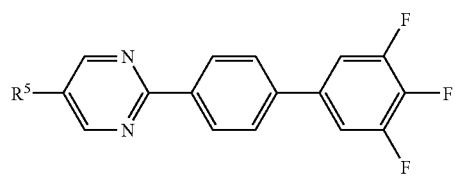

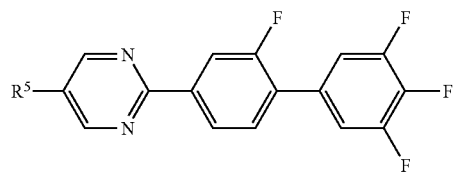

wherein $R^5$ is alkyl having 1 to 12 carbons.

4. The liquid crystal composition according to item 3, wherein the first component is at least one compound selected from the group of compounds represented by formula (1-1).

5. The liquid crystal composition according to item 3, wherein the first component is at least one compound selected from the group of compounds represented by formula (1-2).

6. The liquid crystal composition according to item 3, wherein the first component is at least one compound selected from the group of compounds represented by formula (1-3).

7. The liquid crystal composition according to item 3, wherein the first component is at least one compound selected from the group of compounds represented by formula (1-4).

8. The liquid crystal composition according to item 3, wherein the first component is at least one compound selected from the group of compounds represented by formula (1-1) and at least one compound selected from the group consisting of compounds represented by formula (1-2).

9. The liquid crystal composition according to item 3, wherein the first component is at least one compound selected from the group of compounds represented by formula (1-1) and at least one compound selected from the group of compounds represented by formula (1-4).

10. The liquid crystal composition according to item 3, wherein the first component is at least one compound selected from the group of compounds represented by formula (1-1), at least one compound selected from the group of compounds represented by formula (1-2) and at least one compound selected from the group of compounds represented by formula (1-4).

11. The liquid crystal composition according to one of items 2 to 10, wherein in formulas (2-1) and (2-2), $R^4$ is hydrogen, and $R^5$, $R^6$, $R^7$ and $R^8$ are methyl.

12. The liquid crystal composition according to any one of items 1 to 11, wherein the ratio of the first component is in a range of from approximately 5% to approximately 40% by weight, and the ratio of the second component is in a range of from approximately 0.001% to approximately 5% by weight, based on the total weight of the liquid crystal composition.

13. The liquid crystal composition according to any one of items 1 to 12, wherein the composition further includes at least one compound selected from the group of compounds having a group represented by formulas (3-1) and (3-2) as a third component:

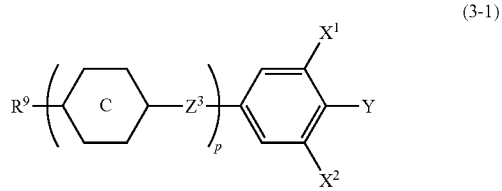

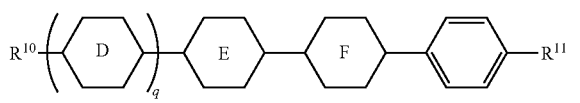

wherein $R^9$ is alkyl having 1 to 12 carbons or alkenyl having 2 to 12 carbons; $R^{10}$ and $R^{11}$ are each independently alkyl having 1 to 12 carbons, alkenyl having 2 to 12 carbons or alkoxy having 1 to 12 carbons; ring C is 1,4-cyclohexylene, 1,3-dioxane-2,5-diyl, 1,4-phenylene, 3-fluoro-1,4-phenylene or 3,5-difluoro-1,4-phenylene; ring D and ring E are each independently 1,4-cyclohexylene or 1,4-phenylene; ring F is 1,4-cyclohexylene, 1,4-phenylene or 3-fluoro-1,4-phenylene; $Z^3$ is a single bond, ethylene or ester; $X^1$ and $X^2$ are each independently hydrogen or fluorine; Y is fluorine, chlorine or trifluoromethoxy; p is 1, 2 or 3; and q is 0 or 1.

14. The liquid crystal composition according to item 13, wherein the ratio of the third component is approximately 90% by weight or less based on the total weight of the liquid crystal composition.

15. The liquid crystal composition according to items 1 to 14, wherein the composition has a maximum temperature of a nematic phase of approximately 70° C. or more, an optical anisotropy (25° C.) at a wavelength of 589 nm of approximately 0.08 or more, and an optical anisotropy (25° C.) at a frequency of 1 kHz of approximately 2 or more.

16. A liquid display device that includes the liquid crystal composition according to any one of items 1 to 15.

The invention further includes: (1) the composition described above, wherein the composition further contains an optically active compound; (2) the composition described above, wherein the composition further contains an additive, such as an antioxidant, an ultraviolet light absorbent and/or a defoaming agent; (3) an AM device containing the composition described above; (4) a device having a TN, ECB, OCB or IPS, containing the composition described above; (5) a device of a transmission type, containing the composition described above; (6) use of the composition described above as a composition having a nematic phase; and (7) use as an optically active composition by adding an optically active compound to the composition described above.

The composition of the invention will be explained in the following order. First, the constitution of component compounds in the composition will be explained. Second, the main characteristics of the component compounds and the main effects of the compounds on the composition will be explained. Third, a desirable ratio of the component compounds and the basis thereof will be explained. Fourth, a desirable embodiment of the component compounds will be explained. Fifth, examples of the component compound will be shown. Sixth, the preparation methods of the component compound will be explained. Seventh, additives that may be added to the composition will be explained. Lastly, use of the composition will be explained.

First, the constitution of component compounds in the composition will be explained. The composition of the invention may further contain other liquid crystal compounds, an additive, an impurity, and so forth. The other liquid crystal compounds are different from the compound (1), the compound (2-1), the compound (2-2), the compound (3-1) and the compound (3-2). Such a compound is mixed with the composition for the purpose of adjusting the characteristics of the composition. The additive includes an optically active compound, a coloring matter, an antioxidant, an ultraviolet light absorbent and so forth. The impurity is a compound and so forth contaminated in the process such as the synthesis of a component compound and so forth.

Second, the main characteristics of the component compounds and the main effects of the compounds on the composition will be explained. The main characteristics of the component compounds are summarized in Table 2. In Table 2, the symbol L represents large or high, the symbol M represents a middle degree, and the symbol S represents small or low. The symbols L, M and S are classification based on qualitative comparison among the component compounds.

TABLE 2

Characteristics of Compounds

|  | (1) | (3-1) | (3-2) |
|---|---|---|---|
| Maximum Temperature | S-M | S-M | M-L |
| Viscosity | M-L | M-L | S-M |
| Optical Anisotropy | M-L | S-M | M-L |
| Dielectric Anisotropy | L | M | S |
| Stability to Ultraviolet Light | S | M-L | L |

As shown in Table 2, the compound (1) is low in stability to ultraviolet light. However, the stability to ultraviolet light can be improved by adding the compound (2-1) or the compound (2-2).

As the second component used in the invention, a known hindered amine light stabilizer (hereinafter, referred to as HALS) is preferably used. Examples of a commonly known light stabilizer other than HALS include an ultraviolet light absorbent, which have a different stabilizing mechanism. The ultraviolet light absorbent absorbs ultraviolet light to attain stabilization, but HALS has a sophisticated stabilizing mechanism including inhibition of chain reaction by scavenging radicals formed with ultraviolet light, decomposition of hydroperoxide, and so forth, and is thus used as a multi-functional stabilizer.

In the invention, it has been found that HALS is significantly effective for stabilization to ultraviolet light of a composition having a pyrimidine ring. A part of HALS used in the invention is commercially available. A preferred and specific example thereof includes TINUVIN-770, produced by Ciba Specialty Chemicals, Inc. The molecular weight of HALS is preferably small since the solubility in a liquid crystal is lowered to make dispersion difficult when the molecular weight is large. The molecular weight of HALS used is preferably selected depending on a liquid crystal, to which HALS is added.

HALS is classified into an NH type, an NR type, an NOR type and so forth based on the base type, all of which may be used in the invention, and an NH type is preferred. Plural kinds of HALS may be used in combination, and an ultraviolet light absorbent may be used in combination. The ratio of a hindered amine portion is preferably large within a range where the other characteristics are not impaired since the stabilization effect to ultraviolet light is increased when the ratio of a hindered amine portion is large.

The main effects of the component compounds to the characteristics of the composition upon mixing the component compounds to the composition are as follows. The compound (1) increases the optical anisotropy and increases the dielectric anisotropy. The compound (2-1) and the compound (2-2) increase the stability to ultraviolet light. The compound (3-1) and the compound (3-2) increase the maximum temperature, decrease the minimum temperature, and decrease the viscosity. A cyano compound is not preferred as the component compound since it is low in stability to ultraviolet light and heat.

Third, desirable ratios of the component compounds and the basis therefor will be explained. A desirable ratio of the first component is approximately 5% by weight or more for increasing the optical anisotropy and increasing the dielectric anisotropy, and is approximately 40% by weight or less for decreasing the minimum temperature. A desirable ratio is from approximately 10% by weight to approximately 35% by weight. A more desirable ratio is from approximately 10% to approximately 30%.

A desirable ratio of the second component is approximately 0.001% by weight or more for suppressing the voltage holding ratio from being lowered after irradiation with ultraviolet light, and is approximately 5% by weight or less for increasing the maximum temperature or decreasing the minimum temperature. A more desirable ratio is from approximately 0.005% by weight to approximately 2% by weight. A particularly desirable ratio is from approximately 0.01% by weight to approximately 0.5% by weight.

The third component is suitable for preparing a composition having a particularly small viscosity. A desirable ratio of the component is approximately 90% by weight or less. A more desirable ratio is approximately 85% by weight or less. A particularly desirable ratio is approximately 80% by weight or less.

Fourth, a desirable embodiment of the component compound will be explained. $R^1$ and $R^2$ are each independently hydrogen, fluorine, alkyl having 1 to 12 carbons, alkenyl having 2 to 12 carbons or alkoxy having 1 to 12 carbons. Desirable $R^1$ and $R^2$ each are linear alkyl having 1 to 10 carbon atoms in order to enhance the stability to ultraviolet ray or heat. $R^4$ is hydrogen, alkyl having 1 to 12 carbons or alkoxy having 1 to 12 carbons. Desirable $R^4$ is hydrogen. $R^5$, $R^6$, $R^7$ and $R^8$ are each independently alkyl having 1 to 12 carbons. Desirable $R^5$, $R^6$, $R^7$ and $R^8$ each are linear alkyl having 1 to 10 carbons. $R^9$ is alkyl having 1 to 12 carbons or alkenyl having 2 to 12 carbons. Desirable $R^9$ is linear alkyl having 1 to 10 carbons. $R^{10}$ and $R^{11}$ are each independently alkyl having 1 to 12 carbons, alkenyl having 2 to 12 carbons or alkoxy having 1 to 12 carbons. Desirable $R^{10}$ and $R^{11}$ each are linear alkyl having 1 to 10 carbons. $R^{12}$ and $R^{13}$ are each independently hydrogen or alkyl having 1 to 5 carbons. Desirable $R^{12}$ and $R^{13}$ each are hydrogen.

Desirable alkyl are methyl, ethyl, propyl, butyl, pentyl, hexyl, heptyl, or octyl. More desirable alkyl are ethyl, propyl, butyl, pentyl, or heptyl for decreasing the viscosity.

Desirable alkenyl are vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl, or 5-hexenyl. More desirable alkenyl are vinyl, 1-propenyl, 3-butenyl, or 3-pentenyl for decreasing the viscosity. A desirable configuration of —CH=CH— in these alkenyls depends on the position of a double bond. Trans is desirable in the alkenyl such as 1-propenyl, 1-butenyl, 1-pentenyl, 1-hexenyl, 3-pentenyl, and 3-hexenyl for decreasing the viscosity. Cis is desirable in the alkenyl such as 2-butenyl, 2-pentenyl and 2-hexenyl. In these alkenyls, linear alkenyl is preferable to branched alkenyl.

Desirable alkoxy are methoxy, ethoxy, propoxy, butoxy, pentyloxy, hexyloxy, or heptyloxy. More desirable alkoxy are methoxy or ethoxy for decreasing the viscosity.

Ring A and ring B are each independently 1,4-cyclohexylene, 1,4-phenylene, 3-fluoro-1,4-phenylene or 3,5-difluoro-1,4-phenylene. Desirable ring A and ring B each are 1,4-phenylene for increasing the optical anisotropy and decreasing the minimum temperature. Ring C is 1,4-cyclohexylene, 1,3-dioxane-2,5-diyl, 1,4-phenylene, 3-fluoro-1,4-phenylene or 3,5-difluoro-1,4-phenylene. Desirable ring C is 1,4-cyclohexylene for increasing the maximum temperature and decreasing the minimum temperature. On the configuration of 1,4-cyclohexylene, trans is preferable to cis for increasing the maximum temperature. Ring D and ring E are each independently 1,4-cyclohexylene or 1,4-phenylene. Desirable ring D and ring E each are 1,4-cyclohexylene for increasing the maximum temperature and decreasing the minimum temperature. On the configuration of 1,4-cyclohexylene, trans is preferable to cis for increasing the maximum temperature. Ring F is 1,4-cyclohexylene, 1,4-phenylene or 3-fluoro-1,4-phenylene. Desirable ring F is 1,4-cyclohexylene for increasing the maximum temperature and decreasing the minimum temperature. On the configuration of 1,4-cyclohexylene, trans is preferable to cis for increasing the maximum temperature.

$Z^1$ and $Z^2$ are each independently a single bond or ethylene (—$CH_2CH_2$—). Desirable $Z^1$ and $Z^2$ each are a single bond for decreasing the viscosity.

$Z^3$ is a single bond, ethylene or ester. Desirable $Z^3$ is a single bond for decreasing the viscosity.

$X^1$ and $X^2$ are each independently hydrogen or fluorine. Desirable $X^1$ and $X^2$ each are fluorine for increasing the dielectric anisotropy and decreasing the minimum temperature.

Y is fluorine, chlorine or trifluoromethoxy. Desirable Y is fluorine for increasing the dielectric anisotropy.

Fifth, examples of the component compound will be shown. In the desirable compounds described below, $R^5$ is linear alkyl having 1 to 12 carbons. $R^9$ is linear alkyl having 1 to 12 carbons or linear alkenyl having 2 to 12 carbons. Alkyl is desirable to alkenyl for increasing stability to ultraviolet light or heat, and so forth. Desirable $R^9$ is linear alkyl having 1 to 10 carbons. In these desirable compounds, trans is preferable to cis for the configuration of 1,4-cyclohexylene for increasing the maximum temperature. The symbol $R^5$ is used for many compounds in the chemical formulas for the component compounds. $R^5$ may be identical or different in these compounds. In one case, for example, $R^5$ of the compound (1-1) is ethyl and $R^5$ of the compound (1-2) is ethyl. In another case, $R^5$ of the compound (1-1) is ethyl and $R^5$ of the compound (1-2) is propyl. This rule is also applicable to the symbols $R^1$, $R^2$, and so forth.

Desirable compound (1) are the compounds (1-1) to (1-4). More desirable compound (1) are the compounds (1-1), (1-2) and (1-4) for decreasing the minimum temperature. Desirable compound (2-1) are the compounds (2-1-1) to (2-1-5). More desirable compound (2-1) are the compounds (2-1-1) and (2-1-2) for further increasing the stability to ultraviolet light or heat. Desirable compound (2-2) are the compounds (2-2-1) to (2-2-16). More desirable compound (2-2) are the compounds (2-2-3) to (2-2-5) and the compounds (2-2-10) to (2-2-14) for further increasing the stability to ultraviolet light or heat. Desirable compound (3-1) are the compounds (3-1-1) to (3-1-7). More desirable compound (3-1) are the compounds (3-1-1) and the compounds (3-1-3) to (3-1-5) for decreasing the viscosity. Desirable compound (3-2) are the compounds (3-2-1) to (3-2-4). More desirable compound (3-2) are the compounds (3-2-1) to (3-2-3) for decreasing the viscosity. Especially desirable compound (3-2) is the compound (3-2-1).

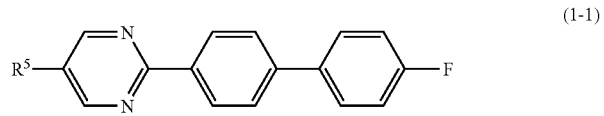
(1-1)

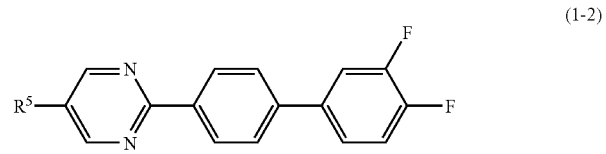
(1-2)

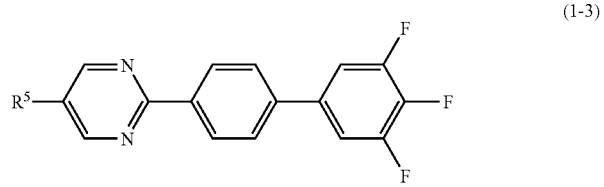
(1-3)

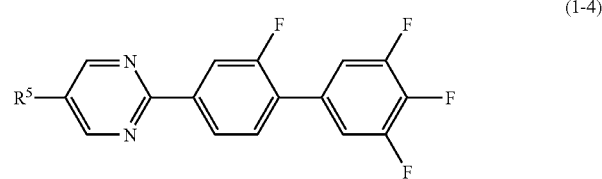
(1-4)

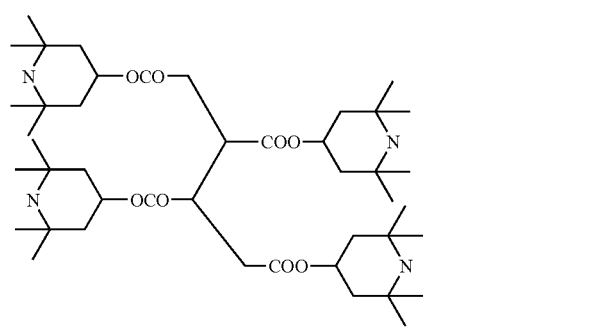
(2-1-1)

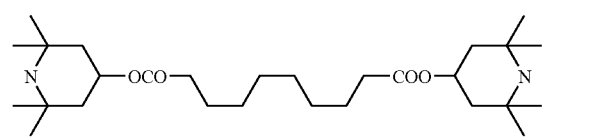
(2-1-2)

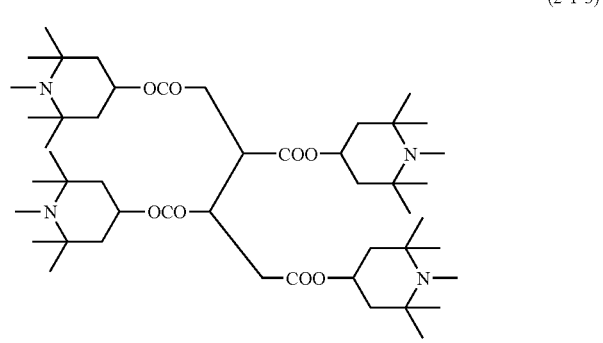
(2-1-3)

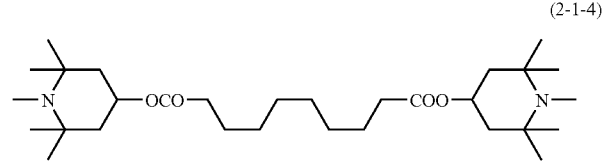
(2-1-4)

-continued

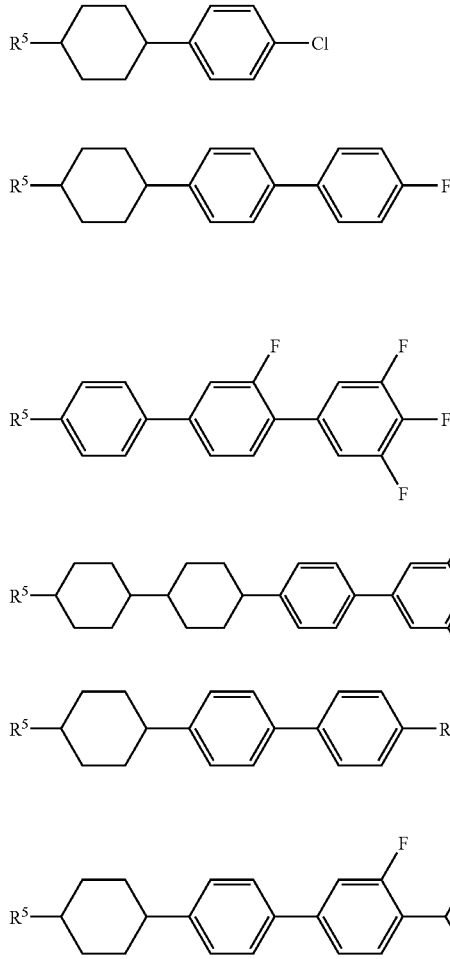
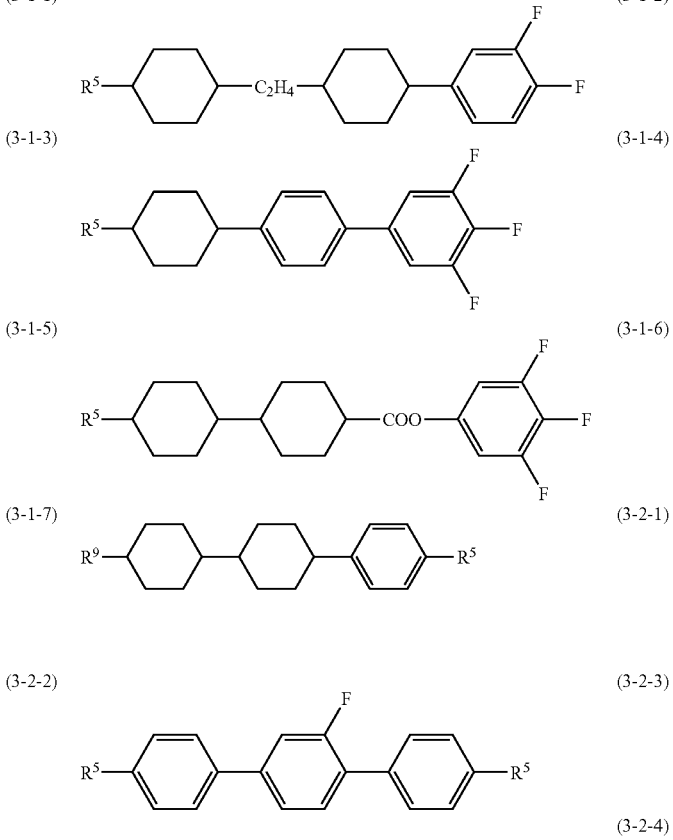

Sixth, the preparation methods of the component compounds will be explained. These compounds can be prepared by known methods. The preparation method will be exemplified below. The compound (1-1) is prepared by the method disclosed in JP S59-216876A/1984. The compound (2-1-1) is available from Asahi Denka Co., Ltd. The compound (3-1-1) is prepared by the method disclosed in JP S57-2226 A/1982. The compound (3-2-1) is prepared by the method disclosed in JP H4-30382 B/1992.

The compounds for which preparation methods were not described above can be prepared according to the methods described in ORGANIC SYNTHESES (John Wiley & Sons, Inc.), ORGANIC REACTIONS (John Wiley & Sons, Inc.), COMPREHENSIVE ORGANIC SYNTHESIS (Pergamon Press), NEW EXPERIMENTAL CHEMISTRY COURSE (Shin Jikken Kagaku Kouza) (Maruzen, Inc.), and so forth. The compound of formula (5) wherein n is 1 is commercially available, for example, from Aldrich. The compound (5) wherein n is 7 can be synthesized according to the method described in U.S. Pat. No. 3,660,505. The composition is prepared according to known methods using the compounds thus obtained. For example, the component compounds are mixed and dissolved in each other by heating.

Seventh, additives capable of being mixed with the composition will be explained. The additives include an optically active compound, a coloring matter, an antioxidant, an ultraviolet light absorbent and so forth. An optically active compound is mixed in the composition for inducing a helical structure of liquid crystal to provide a twist angle. Examples of the optically active compound include the compounds (4-1) to (4-4) below. A desirable ratio of the optically active compound is approximately 5% by weight or less, and a more desirable ratio thereof ranges from approximately 0.01% by weight to approximately 2%.

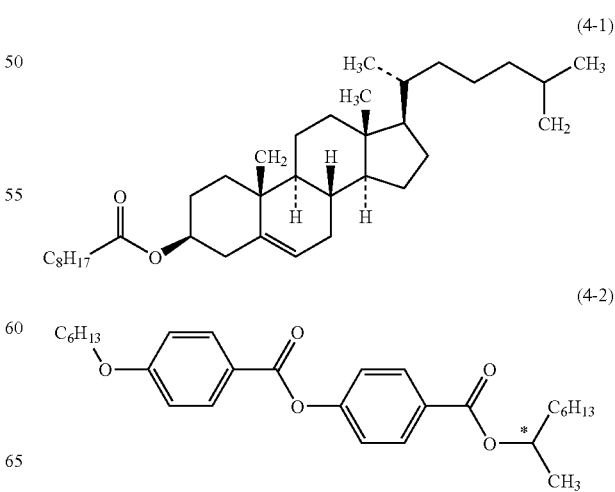

-continued

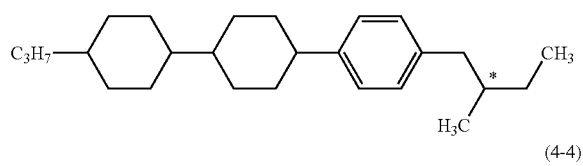

(4-3)

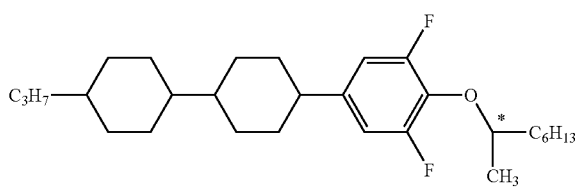

(4-4)

A dichroic dye such as an azo dye or an anthraquinone dye is mixed with the composition to suit for a device of a guest host (GH) mode. A desirable ratio of the dye ranges from approximately 0.01% to approximately 10%. An antioxidant is mixed with the composition in order to avoid a decrease in specific resistance caused by heating in the air, or to maintain a large voltage holding ratio at room temperature and also at a high temperature even after the device has been used for a long time. A desirable ratio of the antioxidant is approximately 50 ppm or more for obtaining the advantage thereof and is approximately 600 ppm or less for preventing the maximum temperature from being decreased and preventing the minimum temperature from being increased. A more desirable ratio thereof ranges from approximately 100 ppm to approximately 300 ppm.

Preferred examples of the antioxidant include the compound (5)

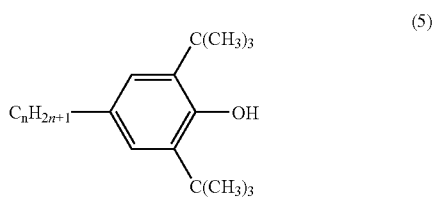

(5)

wherein n is an integer of from 1 to 9. In the compound (5), desirable n are 1, 3, 5, 7, or 9. More desirable n are 1 or 7. When n is 1, the compound (5) has a large volatility, and is effective in preventing the decrease of specific resistance caused by heating in the air. When n is 7, the compound (5) has a small volatility, and is effective in maintaining a large voltage holding ratio at room temperature and also at a high temperature even after the device has been used for a long time.

Preferred examples of the ultraviolet light absorbent include a benzophenone derivative, a benzoate derivative and a triazole derivative. A desirable ratio of the ultraviolet light absorbent is approximately 50 ppm or more for obtaining the advantage thereof and is approximately 10,000 ppm or less for preventing the maximum temperature from being decreased and preventing the minimum temperature from being increased. A more desirable ratio thereof ranges from approximately 100 ppm to approximately 10,000 ppm.

Last, use of the composition will be explained. Most of the compositions have a minimum temperature of approximately −10° C. or less, a maximum temperature of 70° C. or more, and an optical anisotropy of approximately 0.08 to approximately 0.20. The device containing the composition has a large voltage holding ratio. The composition is suitable for an AM device. The composition is suitable especially for an AM device of a transmission type. The composition having an optical anisotropy of approximately 0.08 to approximately 0.25 and further having an optical anisotropy of approximately 0.12 to approximately 0.30 may be prepared by controlling ratios of the component compounds or by mixing other liquid crystal compounds. The composition can be used as a composition having a nematic phase and as an optically active composition by adding an optically active compound.

The composition can be used for an AM device. It can also be used for a PM device. The composition can also be used for a device having a mode such as PC, TN, STN, ECB, OCB, IPS, VA, and so forth. It is desirable to use the composition for a device having a mode of TN or OCB. These devices may be of a reflection type, a transmission type or a semi-transmission type. It is desirable to use the composition for a device of a transmission type. It can be used for an amorphous silicon-TFT device or a polycrystal silicon-TFT device. The composition is also usable for a nematic curvilinear aligned phase (NCAP) device prepared by microcapsulating the composition, and for a polymer dispersed (PD) device in which a three dimensional net-work polymer is formed in the composition, for example, a polymer network (PN) device.

It will be apparent to those skilled in the art that various modifications and variations can be made in the invention and specific examples provided herein without departing from the spirit or scope of the invention. Thus, it is intended that the invention covers the modifications and variations of this invention that come within the scope of any claims and their equivalents.

The following examples are for illustrative purposes only and are not intended, nor should they be interpreted to, limit the scope of the invention.

EXAMPLES

The invention will be explained in detail by way of Examples. The invention is not limited by the Examples described below. The compounds described in the Comparative Examples and the Examples are expressed by the symbols according to the definitions in Table 3. In Table 3, the configuration of 1,4-cyclohexylene is trans. The parenthesized number next to the symbolized compounds in the Examples corresponds to the number of the desirable compound. The symbol (−) means other liquid crystal compound. A ratio (percentage) of a liquid crystal compound is percentage by weight (% by weight) based on the total weight of liquid crystal compounds. Last, the characteristics of the composition are summarized.

TABLE 3

| Method of Description of Compound using Symbols R—(A$_1$)—Z$_1$—...—Z$_n$—(A$_n$)—R' | |
|---|---|
| | Symbol |
| 1) Left Terminal Group R— | |
| C$_n$H$_{2n+1}$— | n- |
| C$_n$H$_{2n+1}$O— | nO— |
| C$_n$H$_{2n+1}$OC$_m$H$_{2m}$— | nOm- |
| CH$_2$=OH— | V— |
| CH$_2$=CHC$_n$H$_{2n}$— | Vn- |

TABLE 3-continued

Method of Description of Compound using Symbols
R—(A₁)—Z₁—...—Zₙ—(Aₙ)—R'

| | Symbol |
|---|---|
| 2) Ring structure —Aₙ— | |
| (cyclohexane) | H |
| (benzene) | B |
| (fluorobenzene) | B(F) |
| (difluorobenzene) | B(3F, 5F) |
| (pyrimidine) | Py |
| 3) Bonding Group —Zₙ— | |
| —C₂H₄— | 2 |
| —COO— | E |
| —CF₂O— | X |
| 4) Right Terminal Group —R' | |
| —CₙH₂ₙ₊₁ | -n |
| —OCₙH₂ₙ₊₁ | —On |
| —CH=CH₂ | —V |
| —CH=CHCₙH₂ₙ₊₁ | -Vn |
| —F | —F |
| —Cl | —CL |
| —CF₃ | —CF3 |
| —OCF₃ | —OCF3 |
| —CN | —C |

Example of Description

Example 1 3-PyBB-F $C_3H_7$—[pyrimidine]—[benzene]—[benzene]—F

Example 2 101-HBBH-5

$CH_3OCH_2$—[cyclohexane]—[benzene]—[benzene]—[cyclohexane]—$C_5H_{11}$

Example 3 V-HHB-1

$CH_2$=CH—[cyclohexane]—[cyclohexane]—[benzene]—$CH_3$

The composition is prepared by first measuring components such as a liquid crystal compound and then by mixing them. Thus, it is easy to calculate the percentage by weight of the component. However, it is not easy to calculate exactly the ratios of the components by analyzing the composition with gas chromatography because the correction coefficient depends on the kind of a liquid crystal compound. Fortunately, the correction coefficient is approximately 1. Furthermore, the difference of approximately 1% by weight only slightly influences on characteristics of the composition. Therefore, the peak area ratio of the component peaks in the gas chromatograph can be regarded as a percentage by weight of the component compound. Namely, the results of gas chromatographic analysis (peak area ratio) are considered to be equivalent to the percentage by weight of a liquid crystal compound without correction.

When a sample was a composition, it was measured as it was, and the obtained value is described here. When a sample was a compound, a sample for measurement was prepared by mixing 15% by weight of the compound and 85% by weight of mother liquid crystals. A value of characteristic of the compound was calculated by extrapolating from a value obtained by measurement. Namely: extrapolated value= (value measured−0.85×value measured for mother liquid crystals)/0.15. When a smectic phase (or crystals) separated out at this ratio at 25° C., a ratio of the compound and mother liquid crystals was changed step by step in the order of (10% by weight/90% by weight), (5% by weight/95% by weight), (1% by weight/99% by weight), respectively. Values for a maximum temperature, optical anisotropy, viscosity, and dielectric anisotropy of the compound were obtained by the extrapolation.

The composition of the mother liquid crystals is as shown below.

$C_3H_7$—[cyclohexane]—[benzene]—CN    24%

$C_5H_{11}$—[cyclohexane]—[cyclohexane]—[benzene]—CN    36%

$C_7H_{15}$—[cyclohexane]—[cyclohexane]—[benzene]—CN    25%

$C_5H_{11}$—[cyclohexane]—[benzene]—[benzene]—CN    15%

Measurement of the characteristics was carried out according to the following methods. Most methods are described in the Standard of Electric Industries Association of Japan, EIAJ-ED-2521 A or those with some modifications. A TFT was not attached to a TN device used for measurement.

Maximum Temperature of a Nematic Phase (NI; ° C.): A sample was placed on a hot plate in a melting point apparatus equipped with a polarizing microscope and was heated at the rate of 1° C. per minute. A temperature was measured when a part of the sample began to change from a nematic phase into an isotropic liquid. A higher limit of a temperature range of a nematic phase may be abbreviated to "a maximum temperature."

Minimum Temperature of a Nematic Phase (Tc; ° C.): A sample having a nematic phase was put in a glass vial and then kept in a freezer at temperatures of 0° C., −10° C., −20° C., −30° C., and −40° C. for ten days, respectively, and a liquid crystal phase was observed. For example, when the sample remained in a nematic phase at −20° C. and changed to crystals or a smectic phase at −30° C., Tc was expressed as ≦−20° C. A lower limit of a temperature range of a nematic phase may be abbreviated to "a minimum temperature."

Viscosity (η; measured at 20° C., mPa·s): A viscosity was measured by means of an E-type viscometer.

Rotation Viscosity (γ1; measured at 25° C.; mPa·s): Rotation viscosity was measured according to the method disclosed in M. Imai, et al., *Molecular Crystals and Liquid Crystals*, vol. 259, p. 37 (1995). A sample was placed in a device, in which a twist angle was 0°, and a cell gap between two glass plates was 5 μm. The TN device was impressed with a voltage in a range of from 16 V to 19.5 V stepwise by 0.5 V. After a period of 0.2 second with no impress of voltage, voltage impress was repeated with only one rectangular wave (rectangular pulse of 0.2 second) and application of no voltage (2 seconds). A peak current and a peak time of a transient current generated by the voltage impress were measured. Rotation viscosity was obtained from the measured values and the calculating equation (8) in the literature by M. Imai, et al., p. 40. As the dielectric anisotropy necessary for the calculation, the value measured by the measuring method of dielectric anisotropy described below with the device for measuring the rotation viscosity was used.

Optical Anisotropy (Δn; measured at 25° C.): Measurement was carried out with an Abbe refractometer mounting a polarizing plate on an ocular using a light at a wavelength of 589 nm. The surface of a main prism was rubbed in one direction, and then a sample was dropped on the main prism. Refractive index (n∥) was measured when the direction of a polarized light was parallel to that of the rubbing. Refractive index (n⊥) was measured when the direction of a polarized light was perpendicular to that of the rubbing. A value of optical anisotropy was calculated from the equation: Δn=n∥−n⊥.

Dielectric Anisotropy (Δ∈; measured at 25° C.): A sample having a nematic phase was put in a TN device having a distance between two glass substrates (cell gap) of 9 μm and a twist angle of 80°. Sine waves (10 V, 1 kHz) were impressed onto the device, and a dielectric constant (∈∥) in a major axis direction of a liquid crystal molecule was measured after 2 seconds. Sine waves (0.5 V, 1 kHz) were impressed onto the device, and a dielectric constant (∈⊥) in a minor axis direction of a liquid crystal molecule was measured after 2 seconds. A value of a dielectric anisotropy was calculated from the equation: Δ∈=∈∥−∈⊥.

Threshold Voltage (Vth; measured at 25° C.; V): Measurement was carried out with LCD Evaluation System Model LCD-5100 made by Otsuka Electronics Co., Ltd. The light source was a halogen lamp. A sample was poured into a TN device of a normally white mode, in which a cell gap between two glass plates was about 0.45/Δn (μm), and a twist angle was 80°. Voltage to be impressed onto the device (32 Hz, rectangular waves) was stepwise increased by 0.02 volt starting from 0 V up to 10 V. During the stepwise increasing, the device was irradiated with light in a perpendicular direction, and an amount of the light passing through the device was measured. Voltage-transmission curve was prepared, in which a maximum amount of a light corresponded to 100% transmittance, a minimum amount of a light corresponded to 0% transmittance. Threshold voltage is a value at 90% transmittance.

Voltage Holding Ratio (VHR-1; measured at 25° C.; %): A TN device used for measurement has a polyimide-alignment film and the cell gap between two glass plates is 5 μm. A sample was poured into the device, and then the device was sealed with an adhesive which is polymerized by the irradiation of an ultraviolet light. The TN device was impressed and charged with pulse voltage (60 microseconds at 5 V). Decreasing voltage was measured for 16.7 milliseconds with High Speed Voltmeter and the area A between a voltage curve and a horizontal axis in a unit cycle was obtained. The area B was an area without decreasing. Voltage holding ratio is a percentage of the area A to the area B.

Voltage Holding Ratio (VHR-2; measured at 80° C.; %): A TN device used for measurement has a polyimide-alignment film and the cell gap between two glass plates is 5 μm. A sample was poured into the device, and then the device was sealed with an adhesive which is polymerized by the irradiation of an ultraviolet light. The TN device was impressed and charged with pulse voltage (60 microseconds at 5 V). Decreasing voltage was measured for 16.7 milliseconds with High Speed Voltmeter and the area A between a voltage curve and a horizontal axis in a unit cycle was obtained. The area B was an area without decreasing. Voltage holding ratio is a percentage of the area A to the area B.

Voltage Holding Ratio (VHR-3; measured at 25° C.; %): A voltage holding ratio was measured after irradiating with ultraviolet light to evaluate stability to ultraviolet light. A composition having large VHR-3 has a large stability to ultraviolet light. A TN device used for measurement has a polyimide-alignment film and the cell gap is 5 μm. A sample was poured into the device, and then the device was irradiated with light for 20 minutes. The light source was a superhigh voltage mercury lamp USH-500D (produced by Ushio, Inc.), and the distance between the device and the light source is 20 cm. In measurement of VHR-3, a decreasing voltage is measured for 16.7 milliseconds. VHR-3 is desirably 90% or more, and more desirably 95% or more.

Voltage Holding Ratio (VHR-4; measured at 25° C.; %): A voltage holding ratio was measured after heating an TN device having a sample poured therein in a constant-temperature bath at 80° C. for 500 hours to evaluate stability to heat. A composition having large VHR-4 has a large stability to heat. In measurement of VHR-4, a decreasing voltage is measured for 16.7 milliseconds.

Response Time (τ; measured at 25° C.; millisecond): Measurement was carried out with LCD Evaluation System Model LCD-5100 made by Otsuka Electronics Co., Ltd. Light source is a halogen lamp. Low-pass filter was set at 5 kHz. A sample was poured into a TN device of a normally white mode, in which a cell gap between two glass plates was 5.0 μm, and a twist angle was 80°. Rectangle waves (60 Hz, 5 V, 0.5 seconds) was impressed to the device. During impressing, the device was irradiated with light in a perpendicular direction, and an amount of the light passing through the device was measured. A maximum amount of a light corresponds to 100% transmittance, and a minimum amount of a light corresponds to 0% transmission. Rise time (τr) is a period of time required for the change in transmittance from 90% to 10%. Fall time (τf) is a period of time required for the change in transmittance from 10% to 90%. Response time is a sum of the rise time and the fall time thus obtained.

Gas Chromatographic Analysis: A Gas Chromatograph Model GC-14B made by Shimadzu was used for measurement. The carrier gas was helium (2 milliliters per minute). An evaporator and a detector (FID) were set up at 280° C. and 300° C., respectively. Capillary column DB-1 (length 30 meters, bore 0.32 millimeters, film thickness 0.25 micrometers, dimethylpolysiloxane as stationary phase, no polarity) made by Agilent Technologies, Inc. was used for the separation of the component compound. After the column had been kept at 200° C. for 2 minutes, it was further heated to 280° C. at the rate of 5° C. per minute. A sample was prepared in an acetone solution (0.1% by weight), and 1 microliter of the solution was injected into the evaporator. The recorder used was a Chromatopac Model C-R5A made by Shimadzu or its equivalent. Gas chromatogram obtained showed a retention time of a peak and a peak area corresponding to the component compound.

Solvents for diluting the sample may also be chloroform, hexane, and so forth. The following capillary columns may also be used: HP-1 made by Agilent Technologies Inc. (length 30 meters, bore 0.32 millimeters, film thickness 0.25 micrometers), Rtx-1 made by Restek Corporation (length 30 meters, bore 0.32 millimeters, film thickness 0.25 micrometers), and BP-1 made by SGE International Pty. Ltd. (length 30 meters, bore 0.32 millimeters, film thickness 0.25 micrometers). In order to prevent compound peaks from overlapping, a capillary column CBP1-M50-025 (50 meters, bore 0.25 millimeters, film thickness 0.25 micrometers) made by Shimadzu Corporation may be used. An area ratio of each peak in the gas chromatogram corresponds to a ratio of the component compound. Percentage by weight of the component compound is not completely identical to an area ratio of each peak. According to the invention, however, percentage by weight of the component compound may be regarded to be identical to an area ratio of each peak, when these capillary columns are used because there is no significant difference in correction efficient of component compounds.

Comparative Example 1

The composition has a low stability to ultraviolet light.

| 3-PyBB-F | (1-1) | 9% |
|---|---|---|
| 4-PyBB-F | (1-1) | 9% |
| 5-PyBB-F | (1-1) | 9% |
| 3-PyB(F)B(F,F)-F | (1-4) | 8% |
| 3-HH-O1 | (—) | 25% |
| 5-HH-O1 | (—) | 15% |
| 3-HB-O2 | (—) | 15% |
| 3-HHEBH-3 | (—) | 5% |
| 3-HHEBH-5 | (—) | 5% |

The composition has the following characteristics: NI=86.8° C.; $\Delta n$=0.128; $\Delta\epsilon$=4.6; Vth=2.13 V; $\gamma 1$=99.2 mPa·s; VHR-1=99.0%; VHR-2=98.3%; VHR-3=84.6%.

Comparative Example 2

The composition has a low stability to ultraviolet light.

| 3-PyBB-F | (1-1) | 15% |
|---|---|---|
| 2-H2HB(F)-F | (3-1-2) | 34% |
| 3-H2HB(F)-F | (3-1-2) | 17% |
| 5-H2HB(F)-F | (3-1-2) | 34% |

The composition has the following characteristics: NI=104.3° C.; $\Delta n$=0.104; $\Delta\epsilon$=5.5; $\gamma 1$=202.5 mPa·s; Vth=1.91 V; VHR-1=99.2%; VHR-2=98.3%; VHR-3=85.2%.

Example 1

| 3-PyBB-F | (1-1) | 9% |
|---|---|---|
| 4-PyBB-F | (1-1) | 9% |
| 5-PyBB-F | (1-1) | 9% |
| 3-PyB(F)B(F,F)-F | (1-4) | 8% |
| 3-HH-O1 | (—) | 25% |
| 5-HH-O1 | (—) | 15% |
| 3-HB-O2 | (—) | 15% |
| 3-HHEBH-3 | (—) | 5% |
| 3-HHEBH-5 | (—) | 5% |

The compound (2-1-1) was added in an amount of 0.025% to the composition shown above. The composition has the following characteristics: NI=86.6° C.; $\Delta n$=0.128; $\Delta\epsilon$=4.6; Vth=2.14 V; $\gamma 1$=99.3 mPa·s; VHR-1=99.1%; VHR-2=98.3%; VHR-3=97.9%.

Example 2

| 3-PyBB-F | (1-1) | 15% |
|---|---|---|
| 2-H2HB(F)-F | (3-1-2) | 34% |
| 3-H2HB(F)-F | (3-1-2) | 17% |
| 5-H2HB(F)-F | (3-1-2) | 34% |

The compound (2-1-1) was added in an amount of 0.025% to the composition shown above. The composition has the following characteristics: NI=104.5° C.; $\Delta n$=0.104; $\Delta\epsilon$=5.5; $\gamma 1$=202.6 mPa·s; Vth=1.92 V; VHR-1=99.3%; VHR-2=99.0%; VHR-3=98.0%.

Example 3

| 5-PyBB(F)-F | (1-2) | 15% |
|---|---|---|
| 2-H2HB(F)-F | (3-1-2) | 34% |
| 3-H2HB(F)-F | (3-1-2) | 17% |
| 5-H2HB(F)-F | (3-1-2) | 34% |

The compound (2-1-2) was added in an amount of 0.025% to the composition shown above. The composition has the following characteristics: NI=99.3° C.; $\Delta n$=0.104; $\Delta\epsilon$=5.8; $\gamma 1$=221.4 mPa·s; Vth=1.87 V; VHR-1=99.1%; VHR-2=98.9%; VHR-3=97.9%.

Example 4

| 5-PyBB(F,F)-F | (1-3) | 15% |
|---|---|---|
| 2-H2HB(F)-F | (3-1-2) | 34% |
| 3-H2HB(F)-F | (3-1-2) | 17% |
| 5-H2HB(F)-F | (3-1-2) | 34% |

The compound (2-1-3) was added in an amount of 0.025% to the composition shown above. The composition has the following characteristics: NI=93.1° C.; $\Delta n$=0.098; $\Delta\epsilon$=6.9; $\gamma 1$=227.3 mPa·s; Vth=1.79 V; VHR-1=99.1%; VHR-2=98.8%; VHR-3=97.8%.

Example 5

| | | |
|---|---|---|
| 3-PyB(F)B(F,F)-F | (1-4) | 15% |
| 2-H2HB(F)-F | (3-1-2) | 34% |
| 3-H2HB(F)-F | (3-1-2) | 17% |
| 5-H2HB(F)-F | (3-1-2) | 34% |

The compound (2-1-4) was added in an amount of 0.025% to the composition shown above. The composition has the following characteristics: NI=90.8° C.; Δn=0.097; Δ∈=8.4; γ1=227.3 mPa·s; Vth=1.74 V; VHR-1=99.2%; VHR-2=98.7%; VHR-3=97.8%.

Example 6

| | | |
|---|---|---|
| 3-PyBB-F | (1-1) | 7% |
| 5-PyBB-F | (1-1) | 7% |
| 3-PyBB(F)-F | (1-2) | 7% |
| 5-PyBB(F)-F | (1-2) | 7% |
| 3-HB-CL | (3-1-1) | 18% |
| 3-HBB-F | (3-1-3) | 7% |
| 5-HBB-F | (3-1-3) | 7% |
| 3-HBB(F,F)-F | (3-1-4) | 20% |
| 5-HBB(F,F)-F | (3-1-4) | 20% |

The compound (2-1-5) was added in an amount of 0.025% to the composition shown above. The composition has the following characteristics: NI=81.5° C.; Δn=0.168; Δ∈=9.2; γ1=237.8 mPa·s; Vth=1.63 V; VHR-1=99.1%; VHR-2=98.9%; VHR-3=97.7%.

Example 7

| | | |
|---|---|---|
| 3-PyBB-F | (1-1) | 5% |
| 5-PyBB-F | (1-1) | 5% |
| 3-PyB(F)B(F,F)-F | (1-4) | 15% |
| 4-PyB(F)B(F,F)-F | (1-4) | 5% |
| 5-PyB(F)B(F,F)-F | (1-4) | 11% |
| V-HHB-1 | (3-2-1) | 15% |
| V2-HHB-1 | (3-2-1) | 5% |
| 2-BB(F)B-3 | (3-2-3) | 9% |
| 2-BB(F)B-5 | (3-2-3) | 12% |
| 3-BB(F)B-5 | (3-2-3) | 15% |
| 5-HBB(F)B-3 | (3-2-4) | 3% |

The compound (2-2-1) was added in an amount of 0.05% to the composition shown above. The composition has the following characteristics: NI=120.3° C.; Δn=0.222; Δ∈=13.5; γ1=288.4 mPa·s; Vth=1.35 V; VHR-1=98.9%; VHR-2=98.8%; VHR-3=97.4%.

Example 8

| | | |
|---|---|---|
| 3-PyBB-F | (1-1) | 5% |
| 4-PyBB-F | (1-1) | 5% |
| 5-PyBB-F | (1-1) | 5% |
| 3-PyBB(F)-F | (1-2) | 5% |
| 5-PyBB(F)-F | (1-2) | 5% |
| 3-PyB(F)B(F,F)-F | (1-4) | 5% |
| 5-PyB(F)B(F,F)-F | (1-4) | 5% |
| 3-HB-CL | (3-1-1) | 20% |
| 2-BB(F)B(F,F)-F | (3-1-5) | 5% |
| 3-BB(F)B(F,F)-F | (3-1-5) | 10% |
| 3-HHEB(F,F)-F | (3-1-6) | 10% |
| 3-HHBB(F,F)-F | (3-1-7) | 3% |
| 3-HHB-1 | (3-2-1) | 7% |
| 3-HBB-2 | (3-2-2) | 5% |
| 2-BB(F)B-3 | (3-2-3) | 5% |

The compound (2-2-2) was added in an amount of 0.05% to the composition shown above. The composition has the following characteristics: NI=88.4° C.; Δn=0.180; Δ∈=12.4; γ1=249.4 mPa·s; Vth=1.36 V; VHR-1=99.1%; VHR-2=98.9%; VHR-3=97.7%.

Example 9

| | | |
|---|---|---|
| 3-PyBB-F | (1-1) | 5% |
| 4-PyBB-F | (1-1) | 5% |
| 5-PyBB-F | (1-1) | 5% |
| 3-PyBB(F)-F | (1-2) | 5% |
| 5-PyBB(F)-F | (1-2) | 5% |
| 3-PyB(F)B(F,F)-F | (1-4) | 5% |
| 5-PyB(F)B(F,F)-F | (1-4) | 5% |
| 3-HB-CL | (3-1-1) | 20% |
| 2-BB(F)B(F,F)-F | (3-1-5) | 5% |
| 3-BB(F)B(F,F)-F | (3-1-5) | 10% |
| 3-HHEB(F,F)-F | (3-1-6) | 10% |
| 3-HHBB(F,F)-F | (3-1-7) | 3% |
| 3-HHB-1 | (3-2-1) | 4% |
| 3-HBB-2 | (3-2-2) | 5% |
| 2-BB(F)B-3 | (3-2-3) | 5% |
| VFF-HHB-1 | (—) | 3% |

The compound (2-2-3) was added in an amount of 0.2% to the composition shown above. The composition has the following characteristics: NI=87.7° C.; Δn=0.180; Δ∈=12.4; γ1=249.1 mPa·s; Vth=1.37 V; VHR-1=98.9%; VHR-2=98.8%; VHR-3=97.8%.

Example 10

| | | |
|---|---|---|
| 3-PyBB(F)-F | (1-2) | 15% |
| 2-H2HB(F)-F | (3-1-2) | 34% |
| 3-H2HB(F)-F | (3-1-2) | 17% |
| 5-H2HB(F)-F | (3-1-2) | 34% |

The compound (2-2-4) was added in an amount of 0.025% to the composition shown above. The composition has the following characteristics: NI=104.5° C.; Δn=0.104; Δ∈=5.5; γ1=202.6 mPa·s; Vth=1.92 V; VHR-1=99.2%; VHR-2=99.0%; VHR-3=98.1%.

Example 11

| | | |
|---|---|---|
| 3-PyBB(F)-F | (1-2) | 15% |
| 2-H2HB(F)-F | (3-1-2) | 34% |
| 3-H2HB(F)-F | (3-1-2) | 17% |
| 5-H2HB(F)-F | (3-1-2) | 34% |

The compound (2-2-5) was added in an amount of 0.025% to the composition shown above. The composition has the following characteristics: NI=104.5° C.; Δn=0.104; Δ∈=5.5; γ1=202.6 mPa·s; Vth=1.92 V; VHR-1=99.3%; VHR-2=98.9%; VHR-3=98.0%.

Example 12

| 3-PyBB(F)-F | (1-2)   | 15% |
|-------------|---------|-----|
| 2-H2HB(F)-F | (3-1-2) | 34% |
| 3-H2HB(F)-F | (3-1-2) | 17% |
| 5-H2HB(F)-F | (3-1-2) | 34% |

The compound (2-2-6) was added in an amount of 0.025% to the composition shown above. The composition has the following characteristics: NI=104.5° C.; Δn=0.104; Δ∈=5.5; γ1=202.6 mPa·s; Vth=1.92 V; VHR-1=99.3%; VHR-2=99.0%; VHR-3=98.1%.

Example 13

| 3-PyBB(F)-F | (1-2)   | 15% |
|-------------|---------|-----|
| 2-H2HB(F)-F | (3-1-2) | 34% |
| 3-H2HB(F)-F | (3-1-2) | 17% |
| 5-H2HB(F)-F | (3-1-2) | 34% |

The compound (2-2-7) was added in an amount of 0.025% to the composition shown above. The composition has the following characteristics: NI=104.5° C.; Δn=0.104; Δ∈=5.5; γ1=202.6 mPa·s; Vth=1.92 V; VHR-1=99.1%; VHR-2=99.0%; VHR-3=97.8%.

Example 14

| 3-PyBB(F)-F | (1-2)   | 15% |
|-------------|---------|-----|
| 2-H2HB(F)-F | (3-1-2) | 34% |
| 3-H2HB(F)-F | (3-1-2) | 17% |
| 5-H2HB(F)-F | (3-1-2) | 34% |

The compound (2-2-8) was added in an amount of 0.025% to the composition shown above. The composition has the following characteristics: NI=104.5° C.; Δn=0.104; Δ∈=5.5; γ1=202.6 mPa·s; Vth=1.92 V; VHR-1=99.2%; VHR-2=98.8%; VHR-3=98.0%.

Example 15

| 3-PyBB(F)-F | (1-2)   | 15% |
|-------------|---------|-----|
| 2-H2HB(F)-F | (3-1-2) | 34% |
| 3-H2HB(F)-F | (3-1-2) | 17% |
| 5-H2HB(F)-F | (3-1-2) | 34% |

The compound (2-2-9) was added in an amount of 0.025% to the composition shown above. The composition has the following characteristics: NI=104.5° C.; Δn=0.104; Δ∈=5.5; γ1=202.6 mPa·s; Vth=1.92 V; VHR-1=99.1%; VHR-2=99.0%; VHR-3=97.9%.

Example 16

| 3-PyBB(F)-F | (1-2)   | 15% |
|-------------|---------|-----|
| 2-H2HB(F)-F | (3-1-2) | 34% |
| 3-H2HB(F)-F | (3-1-2) | 17% |
| 5-H2HB(F)-F | (3-1-2) | 34% |

The compound (2-2-10) was added in an amount of 0.025% to the composition shown above. The composition has the following characteristics: NI=104.5° C.; Δn=0.104; Δ∈=5.5; γ1=202.6 mPa·s; Vth=1.92 V; VHR-1=99.2%; VHR-2=99.0%; VHR-3=98.2%.

Example 17

| 3-PyBB(F)-F | (1-2)   | 15% |
|-------------|---------|-----|
| 2-H2HB(F)-F | (3-1-2) | 34% |
| 3-H2HB(F)-F | (3-1-2) | 17% |
| 5-H2HB(F)-F | (3-1-2) | 34% |

The compound (2-2-11) was added in an amount of 0.025% to the composition shown above. The composition has the following characteristics: NI=104.5° C.; Δn=0.104; Δ∈=5.5; γ1=202.6 mPa·s; Vth=1.92 V; VHR-1=99.4%; VHR-2=99.1%; VHR-3=98.2%.

Example 18

| 3-PyBB(F)-F | (1-2)   | 15% |
|-------------|---------|-----|
| 2-H2HB(F)-F | (3-1-2) | 34% |
| 3-H2HB(F)-F | (3-1-2) | 17% |
| 5-H2HB(F)-F | (3-1-2) | 34% |

The compound (2-2-12) was added in an amount of 0.025% to the composition shown above. The composition has the following characteristics: NI=104.5° C.; Δn=0.104; Δ∈=5.5; γ1=202.6 mPa·s; Vth=1.92 V; VHR-1=99.3%; VHR-2=99.0%; VHR-3=98.0%.

Example 19

| 3-PyBB(F)-F | (1-2)   | 15% |
|-------------|---------|-----|
| 2-H2HB(F)-F | (3-1-2) | 34% |
| 3-H2HB(F)-F | (3-1-2) | 17% |
| 5-H2HB(F)-F | (3-1-2) | 34% |

The compound (2-2-13) was added in an amount of 0.025% to the composition shown above. The composition has the following characteristic: NI=104.5° C.; Δn=0.104;

ΔЄ=5.5; γ1=202.6 mPa·s; Vth=1.92 V; VHR-1=99.1%; VHR-2=98.9%; VHR-3=97.9%.

Example 20

| 3-PyBB(F)-F | (1-2) | 15% |
| 2-H2HB(F)-F | (3-1-2) | 34% |
| 3-H2HB(F)-F | (3-1-2) | 17% |
| 5-H2HB(F)-F | (3-1-2) | 34% |

The compound (2-2-14) was added in an amount of 0.025% to the composition shown above. The composition has the following characteristics: NI=104.5° C.; Δn=0.104; ΔЄ=5.5; γ1=202.6 mPa·s; Vth=1.92 V; VHR-1=99.3%; VHR-2=99.1%; VHR-3=98.1%.

Example 21

| 3-PyBB(F)-F | (1-2) | 15% |
| 2-H2HB(F)-F | (3-1-2) | 34% |
| 3-H2HB(F)-F | (3-1-2) | 17% |
| 5-H2HB(F)-F | (3-1-2) | 34% |

The compound (2-2-15) was added in an amount of 0.025% to the composition shown above. The composition has the following characteristics: NI=104.5° C.; Δn=0.104; ΔЄ=5.5; γ1=202.6 mPa·s; Vth=1.92 V; VHR-1=99.2%; VHR-2=98.9%; VHR-3=97.8%.

Example 22

| 3-PyBB(F)-F | (1-2) | 15% |
| 2-H2HB(F)-F | (3-1-2) | 34% |
| 3-H2HB(F)-F | (3-1-2) | 17% |
| 5-H2HB(F)-F | (3-1-2) | 34% |

The compound (2-2-16) was added in an amount of 0.025% to the composition shown above. The composition has the following characteristics: NI=104.5° C.; Δn=0.104; ΔЄ=5.5; γ1=202.6 mPa·s; Vth=1.92 V; VHR-1=99.3%; VHR-2=99.0%; VHR-3=97.9%.

Although the invention has been described and illustrated with a certain degree of particularity, it is understood that the disclosure has been made only by way of example, and that numerous changes in the conditions and order of steps can be resorted to by those skilled in the art without departing from the spirit and scope of the invention.

What is claimed is:

1. A liquid crystal composition having a nematic phase comprising two components, wherein the first component is at least one compound selected from the group of compounds represented by formula (1); and the second component is at least one compound selected from the group of compounds having a group represented by formula (2) as a partial structure:

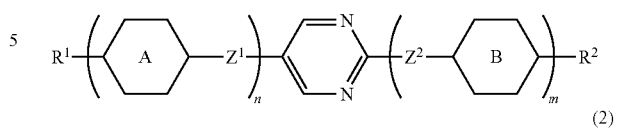

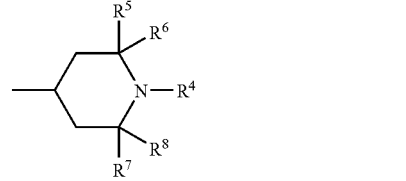

wherein $R^1$ and $R^2$ are each independently hydrogen, fluorine, alkyl having 1 to 12 carbons, alkenyl having 2 to 12 carbons or alkoxy having 1 to 12 carbons; $R^4$ is hydrogen, alkyl having 1 to 12 carbons or alkoxy having 1 to 12 carbons; $R^5$, $R^6$, $R^7$ and $R^8$ are each independently alkyl having 1 to 12 carbons; ring A and ring B are each independently 1,4-cyclohexylene, 1,4-phenylene, 3-fluoro-1,4-phenylene or 3,5-difluoro-1,4-phenylene; $Z^1$ and $Z^2$ are each independently a single bond or ethylene; and n and m are each independently 0, 1 or 2, provided that the sum of n and m is 1, 2, 3 or 4.

2. The liquid crystal composition according to claim 1, wherein the first component is at least one compound selected from the group of compounds represented by formula (1) wherein one of $R^1$ and $R^2$ is fluorine, and the second component is at least one compound selected from the group of compounds represented by formulas (2-1) and (2-2):

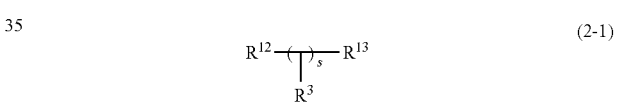

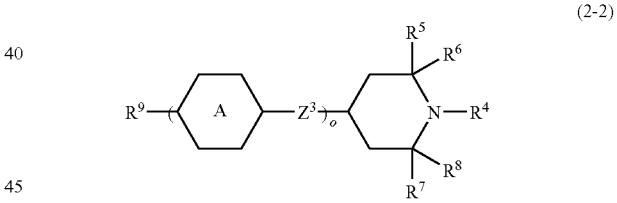

wherein $R^3$ is fluorine or group represented by formula (J), provided that at least one of $R^3$ is a group represented by formula (J);

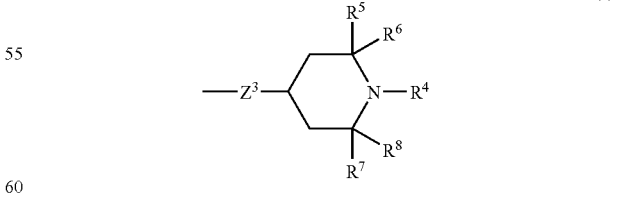

$R^4$ is hydrogen, alkyl having 1 to 12 carbons or alkoxy having from 1 to 12 carbons; $R^5$, $R^6$, $R^7$ and $R^8$ are each independently alkyl having 1 to 12 carbons; $R^9$ alkyl having 1 to 12 carbons or alkenyl having 2 to 12 carbons; $R^{12}$ and $R^{13}$ are each independently hydrogen or alkyl having 1 to 5 carbons; ring A is 1,4-cyclohexylene, 1,4-phenylene, 3-fluoro-1,4- phenylene or 3,5-difluoro-1,4-phenylene; $Z^3$ is a single bond, ethylene or ester; s is an integer of 1 to 20; and o is 1 or 2.

3. The liquid crystal composition according to claim 1, wherein the first component is at least one compound selected from the group of compounds represented by formulas (1-1) to (1-4), the second component is at least one compound selected from the group of compounds represented by formula (2) as a partial structure:

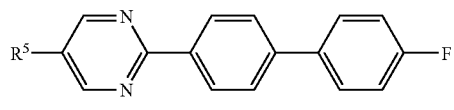
(1-1)

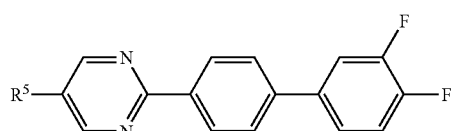
(1-2)

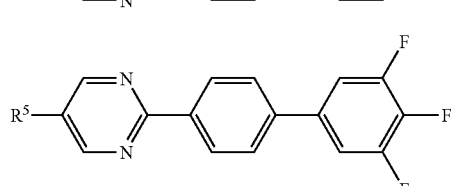
(1-3)

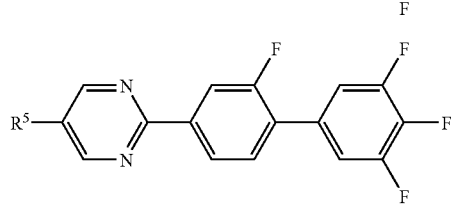
(1-4)

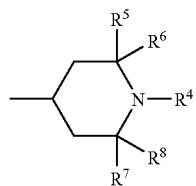
(2)

wherein $R^4$ is hydrogen, alkyl having 1 to 12 carbons or alkoxy having 1 to 12 carbons; and $R^5$, $R^6$, $R^7$ and $R^8$ are each independently alkyl having 1 to 12 carbons.

4. The liquid crystal composition according to claim 1, wherein the first component is at least one compound selected from the group of compounds represented by formulas (1-1) to (1-4), the second component is at least one compound selected from the group of compounds represented by formulas (2-1) and (2-2):

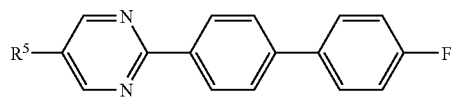
(1-1)

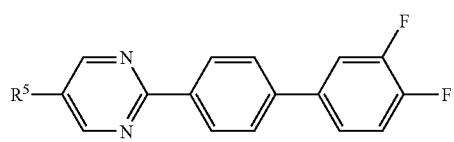
(1-2)

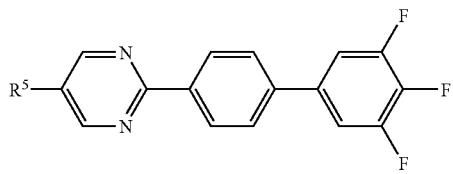
(1-3)

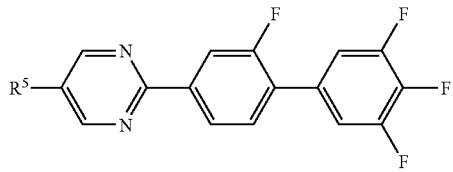
(1-4)

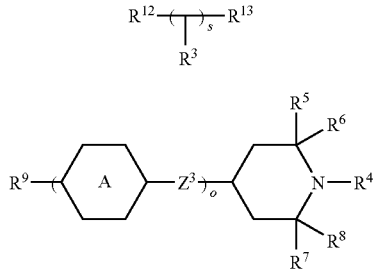
(2-1)

(2-2)

wherein $R^3$ is fluorine or group represented by formula (J), provided that at least one of $R^3$ is a group represented by formula (J);

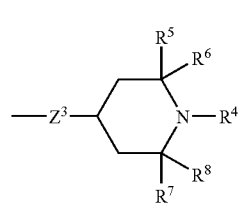
(J)

$R^4$ hydrogen, alkyl having 1 to 12 carbons or alkoxy having from 1 to 12 carbons; $R^5$, $R^6$, $R^7$ and $R^8$ are each independently alkyl having 1 to 12 carbons; $R^9$ is alkyl having 1 to 12 carbons or alkenyl having 2 to 12 carbons; $R^{12}$ and $R^{13}$ are each independently hydrogen or alkyl having 1 to 5 carbons; ring A is 1,4-cyclohexylene, 1,4-phenylene, 3-fluoro-1,4-phenylene or 3,5-difluoro-1,4-phenylene; $Z^3$ is a single bond, ethylene or ester; s is an integer of 1 to 20; and o is 1 or 2.

5. The liquid crystal composition according to claim 1, wherein the first component is at least one compound selected from the group of compounds represented by formula (1-1).

6. The liquid crystal composition according to claim 1, wherein the first component is at least one compound selected from the group of compounds represented by formula (1-2).

7. The liquid crystal composition according to claim 1, wherein the first component is at least one compound selected from the group of compounds represented by formula (1-3).

8. The liquid crystal composition according to claim 1, wherein the first component is at least one compound selected from the group of compounds represented by formula (1-4).

9. The liquid crystal composition according to claim 1, wherein the ratio of the first component is in a range of from approximately 5% to approximately 40% by weight, and the ratio of the second component is in a range of from approximately 0.001% to approximately 5% by weight, based on the total weight of the liquid crystal composition.

10. A liquid crystal composition having a nematic phase comprising three components, wherein the first component is at least one compound selected from the group of compounds represented by formula (1); the second component is at least one compound selected from the group of compounds represented by formula (2) as a partial structure; and the third component is at least one compound selected from the group of compounds having a group represented by formulas (3-1) and (3-2):

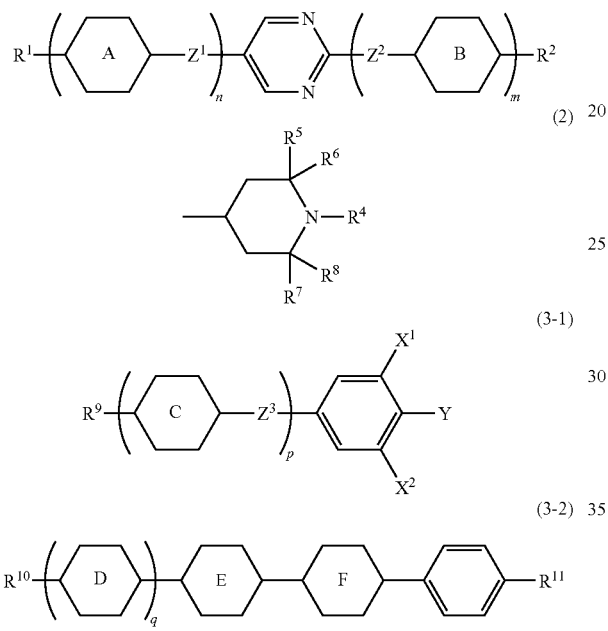

wherein $R^1$ and $R^2$ are each independently hydrogen, fluorine, alkyl having 1 to 12 carbons, alkenyl having 2 to 12 carbons or alkoxy having 1 to 12 carbons; $R^4$ is hydrogen, alkyl having 1 to 12 carbons or alkoxy having 1 to 12 carbons; $R^5$, $R^6$, $R^7$ and $R^8$ are each independently alkyl having 1 to 12 carbons; $R^9$ is alkyl having 1 to 12 carbons or alkenyl having 2 to 12 carbons; $R^{10}$ and $R^{11}$ are each independently alkyl having 1 to 12 carbons, alkenyl having 2 to 12 carbons or alkoxy having 1 to 12 carbons; ring A and ring B are independently 1,4-cyclohexylene, 1,4-phenylene, 3-fluoro-1,4-phenylene or 3,5-difluoro-1,4-phenylene; ring C is 1,4-cyclohexylene, 1,3-dioxane-2,5-diyl, 1,4-phenylene, 3-fluoro-1,4-phenylene or 3,5-difluoro-1,4-phenylene; ring D and ring E are each independently 1,4-cyclohexylene or 1,4-phenylene; ring F is 1,4-cyclohexylene, 1,4-phenylene or 3-fluoro-1,4-phenylene; $Z^1$ and $Z^2$ are each independently a single bond or ethylene; $Z^3$ is a single bond, ethylene or ester; $X^1$ and $X^2$ are each independently hydrogen or fluorine; Y is fluorine, chlorine or trifluoromethoxy; p is 1, 2 or 3; q is 0 or 1; and n and m are each independently 0, 1 or 2, provided that the sum of n and m is 1, 2, 3 or 4.

11. The liquid crystal composition according to claim 10, wherein the first component is at least one compound selected from the group of compounds represented by formulas (1-1) to (1-4), the second component is at least one compound selected from the group of compounds represented by formula (2) as a partial structure, the third component is at least one compound selected from the group of compounds having a group represented by formulas (3-1) and (3-2):

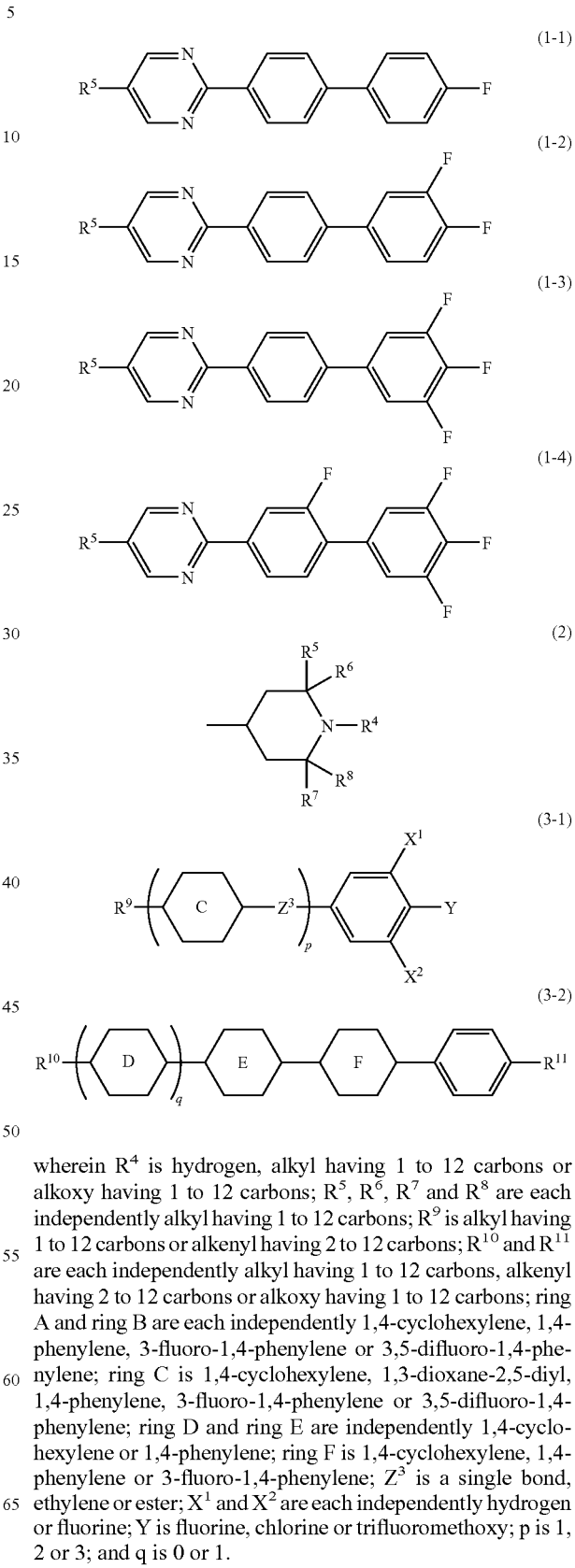

wherein $R^4$ is hydrogen, alkyl having 1 to 12 carbons or alkoxy having 1 to 12 carbons; $R^5$, $R^6$, $R^7$ and $R^8$ are each independently alkyl having 1 to 12 carbons; $R^9$ is alkyl having 1 to 12 carbons or alkenyl having 2 to 12 carbons; $R^{10}$ and $R^{11}$ are each independently alkyl having 1 to 12 carbons, alkenyl having 2 to 12 carbons or alkoxy having 1 to 12 carbons; ring A and ring B are each independently 1,4-cyclohexylene, 1,4-phenylene, 3-fluoro-1,4-phenylene or 3,5-difluoro-1,4-phenylene; ring C is 1,4-cyclohexylene, 1,3-dioxane-2,5-diyl, 1,4-phenylene, 3-fluoro-1,4-phenylene or 3,5-difluoro-1,4-phenylene; ring D and ring E are independently 1,4-cyclohexylene or 1,4-phenylene; ring F is 1,4-cyclohexylene, 1,4-phenylene or 3-fluoro-1,4-phenylene; $Z^3$ is a single bond, ethylene or ester; $X^1$ and $X^2$ are each independently hydrogen or fluorine; Y is fluorine, chlorine or trifluoromethoxy; p is 1, 2 or 3; and q is 0 or 1.

12. The liquid crystal composition according to claim 10, wherein the first component is at least one compound selected from the group of compounds represented by formulas (1-1) to (1-4), the second component is at least one compound selected from the group of compounds represented by formulas (2-1) and (2-2), the third component is at least one compound selected from the group of compounds having a group represented by formulas (3-1) and (3-2):

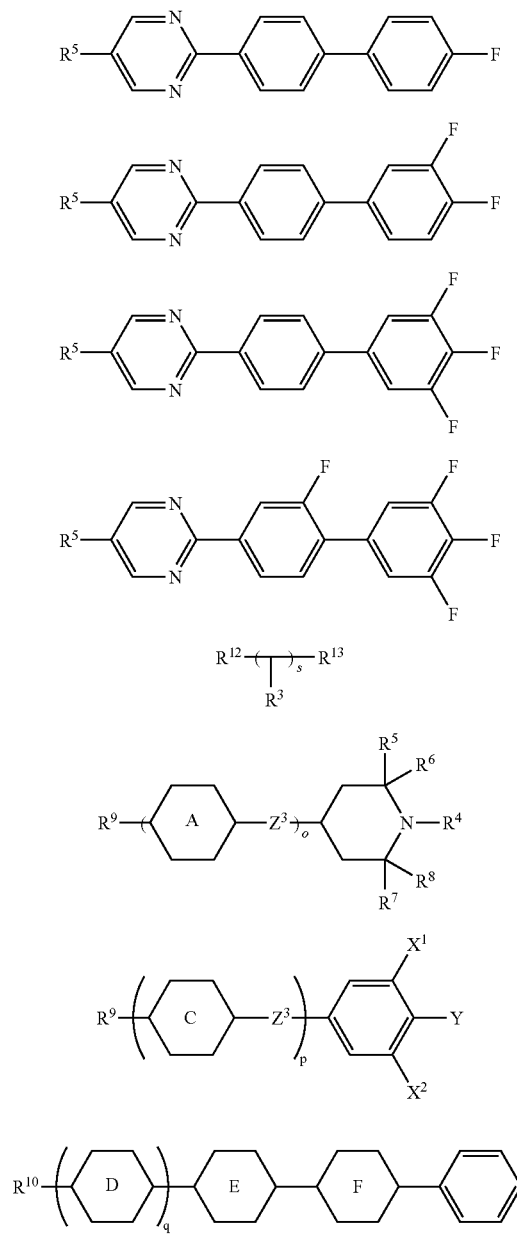

wherein $R^3$ is fluorine or group represented by formula (J), provided that at least one of $R^3$ is a group represented by formula (J);

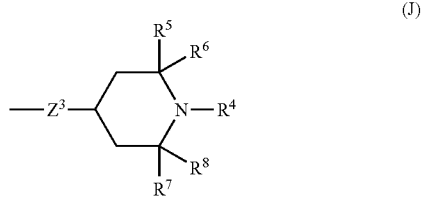

$R^4$ is hydrogen, alkyl having 1 to 12 carbons or alkoxy having 1 to 12 carbons; $R^5$, $R^6$, $R^7$ and $R^8$ are each independently alkyl having 1 to 12 carbons; $R^9$ is alkyl having 1 to 12 carbons or alkenyl having 2 to 12 carbons; $R^{10}$ and $R^{11}$ are each independently alkyl having 1 to 12 carbons, alkenyl having 2 to 12 carbons or alkoxy having 1 to 12 carbons; ring A and ring B are each independently 1,4-cyclohexylene, 1,4-phenylene, 3-fluoro-1,4-phenylene or 3,5-difluoro-1,4-phenylene; ring C is 1,4-cyclohexylene, 1,3-dioxane-2,5-diyl, 1,4-phenylene, 3-fluoro-1,4-phenylene or 3,5-difluoro-1,4-phenylene; ring D and ring E are each independently 1,4-cyclo hexylene or 1,4-phenylene; ring F is 1,4-cyclohexylene, 1,4-phenylene or 3-fluoro-1,4-phenylene; $Z^3$ is a single bond, ethylene or ester; $X^1$ and $X^2$ are each independently hydrogen or fluorine; Y is fluorine, chlorine or trifluoromethoxy; p is 1, 2 or 3; q is 0 or 1; s is an integer of 1 to 20; and o is 1 or 2.

13. The liquid crystal composition according to claim 10, wherein the ratio of the first component is in a range of from approximately 5% to approximately 40% by weight, the ratio of the second component is in a range of from approximately 0.001% to approximately 5% by weight, and the ratio of the third component is approximately 90% by weight or less based on the total weight of the liquid crystal composition.

14. The liquid crystal composition according to claim 1, wherein the composition has a maximum temperature of a nematic phase of at least approximately 70° C. or more, an optical anisotropy (25° C.) at a wavelength of 589 nm of at least approximately 0.08 or more, and an optical anisotropy (25° C.) at a frequency of 1 kHz of at least approximately 2 or more.

15. The liquid crystal composition according to claim 10, wherein the composition has a maximum temperature of a nematic phase of at least approximately 70° C. or more, an optical anisotropy (25° C.) at a wavelength of 589 nm of at least approximately 0.08 or more, and an optical anisotropy (25° C.) at a frequency of 1 kHz of at least approximately 2 or more.

16. A liquid display device comprising the liquid crystal composition according to claim 1.

* * * * *